US012573070B2

(12) United States Patent　　　　(10) Patent No.:　US 12,573,070 B2

Multer　　　　　　　　　　　　　　　(45) Date of Patent:　　Mar. 10, 2026

(54) METHOD AND APPARATUS FOR ACQUIRING MASTER DATA OF AN OBJECT

(71) Applicant: SICK AG, Waldkirch (DE)

(72) Inventor: Christian Multer, Waldkirch (DE)

(73) Assignee: SICK AG, Waldkirch (DE)

( * ) Notice: Subject to any disclaimer, the term of this patent is extended or adjusted under 35 U.S.C. 154(b) by 352 days.

(21) Appl. No.: 18/201,330

(22) Filed: May 24, 2023

(65) Prior Publication Data

US 2023/0419529 A1　　Dec. 28, 2023

(51) Int. Cl.
　　*G06T 7/62*　　　(2017.01)
　　*G06T 5/40*　　　(2006.01)
　　*G06T 7/50*　　　(2017.01)
　　*G06V 10/764*　　(2022.01)

(52) U.S. Cl.
　　CPC ................. *G06T 7/62* (2017.01); *G06T 5/40* (2013.01); *G06T 7/50* (2017.01); *G06V 10/764* (2022.01); *G06T 2207/10028* (2013.01)

(58) Field of Classification Search
　　CPC .... G06T 7/62; G06T 5/40; G06T 7/50; G06T 2207/10028; G06T 7/11; G06T 7/60; G06V 10/764; G06V 20/52; G06V 20/64; G01B 11/24; G01B 11/00; G01B 11/22;
　　　　　　(Continued)

(56) References Cited

U.S. PATENT DOCUMENTS

2007/0272732 A1　11/2007　Hindmon
2010/0139989 A1 *　6/2010　Atwater ............. G01G 23/3735
　　　　　　　　　　　　　　　382/199

(Continued)

FOREIGN PATENT DOCUMENTS

CN　　　110308817 A　　10/2019
EP　　　　2722656 A1 *　4/2014　........ G01B 11/2513
WO　　WO-2021165077 A1 *　8/2021　............ G06V 20/58

OTHER PUBLICATIONS

Lee, et al. "Virtual Touch Sensor Using a Depth Camera"; Sensors; Feb. 20, 2019.

(Continued)

*Primary Examiner* — Henok Shiferaw
*Assistant Examiner* — Woo C Rhim
(74) *Attorney, Agent, or Firm* — Nath, Goldberg & Meyer; Jerald L. Meyer

(57)　　　　　　ABSTRACT
The invention relates to a method and apparatus for collecting master data. The device comprises: a scale, a camera for recording an image of the object, an evaluation unit with a volume determination unit for determining the volume of the object, a starter unit which automatically determines a start time for recording the master data relating to the object volume when the object is placed on the scale, a memory for storing the recorded master data, an output unit for outputting the master data, the starter unit being designed to determine the start time from the recorded image of the camera, and the starter unit having an image evaluation unit for this purpose, and the image evaluation unit being designed to carry out an object classification by means of which, in addition to the object, extraneous objects are also recognized as permissible or impermissible extraneous objects.

8 Claims, 3 Drawing Sheets

(58) Field of Classification Search
CPC .... G01G 19/4144; G01G 19/52; G01G 19/62;
G01G 23/18; G01F 17/00
See application file for complete search history.

(56) References Cited

U.S. PATENT DOCUMENTS

| | | | |
|---|---|---|---|
| 2015/0042791 A1* | 2/2015 | Metois | G06V 20/64 |
| | | | 348/135 |
| 2017/0280125 A1* | 9/2017 | Brown | B65G 1/00 |
| 2017/0358098 A1* | 12/2017 | Lloyd | G01B 11/02 |
| 2019/0213389 A1* | 7/2019 | Peruch | G06T 7/12 |
| 2023/0306625 A1* | 9/2023 | Peruch | G06K 7/1413 |
| 2023/0343069 A1* | 10/2023 | Welwitigoda | G06T 7/0004 |
| 2023/0419529 A1* | 12/2023 | Multer | G06V 20/64 |

OTHER PUBLICATIONS

Hee; "Prototyping A Dimensioning System. Using range cameras for parcel sizing"; Published in Ninja Van Tech Jun. 3, 2018.
Liu, et al.; "Point cloud segmentation based on Euclidean clustering and multi-plane extraction in rugged field"; Institute of Robotics and Automatic Information System, College of Artificial Intelligence, Nankai University, Tianjin 300350, people's Republic of China, Published May 28, 2021.
Metrilus S110 120, Integrated DWS (dimensioning and weighing system) workstation for master data and freight dimensioning.
Office Action dated Oct. 23, 2025 issued in corresponding Chinese Application No. 202310590585.6.

* cited by examiner

METHOD AND APPARATUS FOR ACQUIRING MASTER DATA OF AN OBJECT

The invention relates to a method and an apparatus for acquiring master data of an object.

The master data of an object primarily comprise the volume and the weight. To record this data, the state of the art is to place objects on a scale and measure them with a volume detection system. In order to record correct master data, up to now the object had to lie freely and without extraneous objects in the environment on a scale, on which it is then also measured automatically with the optical volume detection system.

If extraneous objects, such as the hands and arms of personnel placing the objects on the scales, are present in the camera's field of view, the volume capture system can no longer capture the object and its master data correctly. This also applies to the weighing process, where the object on the scale must not be touched to ensure that the weight is not falsified.

Such a master data acquisition system is known from the company Metrilus GmbH under the designation S110/120. This system includes a scale for recording the weight and a 3D camera for determining the volume as well as a code reader. The 3D camera recognizes the object on the scale and starts the master data acquisition when the object is identified with the code reader and no extraneous objects are detected by the volume acquisition system.

To be able to measure an object, it must therefore be placed freely within a defined area. "Placed freely" in this case means that there must be no contact with other objects. Therefore, it is generally necessary to make the measurement area completely free of extraneous objects during a measurement. In this case extraneous objects also include, for example, hands and other objects that protrude into the measuring area from outside without touching the object.

The disadvantage of this is an increased effort during measurement and a resulting speed disadvantage or also false measurements occurring due to measurement of extraneous objects.

It is therefore an object of the invention to provide an improved method and a new device for the acquisition of master data of an object, with which in particular a faster and more reliable acquisition of the master data is possible.

This object is solved by a method with the following features. The method according to the invention for acquiring master data of an object comprises the following steps:
 weighing the object on a scale,
 determining a starting point in time for recording the master data by:
 taking a depth value image of the object with a camera,
 determining contiguous regions in the image that then form first temporary objects,
 classifying the first temporary objects into a valid and an invalid class, wherein all first temporary objects that lie within the image without touching the image edge are sorted into the valid class and first temporary objects with edge contact are sorted into the invalid class,
 analyzing the first temporary objects in the invalid class by evaluating the depth values and forming new subregions with depth values beyond a depth value threshold,
 scanning the subregions for contiguous areas, where these contiguous areas form second temporary objects,
 moving the second temporary objects to the valid class if they do not touch the image edge, finding overlaps of the temporary objects in the valid class with the temporary objects remaining in the invalid class, where the overlap must exceed an overlap threshold,
 in case of overlap, moving the temporary objects in question from the valid class to the invalid class,
 defining the temporary objects in the valid class as the object to be measured,
 if no object is in the valid class, output an error signal, otherwise
 after the starting point in time determined in this way, starting the volume detection of the object,
 recording the master data,
 saving the recorded master data,
 outputting of the master data.

By classifying extraneous objects into permissible and impermissible extraneous objects, it is now possible to also perform data acquisition when extraneous objects, namely permissible extraneous objects, are in the camera's field of view. This increases the throughput, because the data acquisition can already start when the hands release the object placed on the scale but are still in the field of view of the camera.

By classifying the extraneous objects, a more secure data acquisition is also possible. A possible error analysis is also improved as a result.

An advantageous embodiment of the method according to the inventive subject matter consists in recording and evaluating depth value histograms during the analysis of the first temporary objects for the evaluation of the depth values and formation of new subregions with depth values beyond a depth value threshold. This facilitates the classification of the extraneous objects into permissible and impermissible extraneous objects.

Since it happens from time to time in a 3D camera that depth values are missing in regions of the image and no meaningful evaluation can take place in the presence of such regions, in further development of the invention, the search for overlaps also includes the search for overlaps of the temporary objects in the valid class with the regions with missing depth values. If an overlap is detected, the respective temporary object is moved from the valid class to the invalid class.

In a further embodiment of the invention, an error signal is output if no object is in the valid class at the end of the evaluation, which means that master data acquisition is not possible.

The task is likewise solved by a device according to the inventive subject matter for the acquisition of master data of an object, which has the following features:
 a scale,
 a camera for capturing an image of the object,
 an evaluation unit with a volume determination unit for determining the volume of the object,
 a starter unit which automatically determines a starting point in time for recording the master data concerning the object volume when the object is placed on the scale,
 a memory for storing the recorded master data,
 an output unit for outputting the master data,
 wherein
 the starter unit is designed to determine the starting point in time from the recorded image of the camera, and the starter unit has an image evaluation unit for this purpose, and the image evaluation unit is designed to carry out an object classification by means of which, in addition to the object, extraneous objects are also classified as permissible or impermissible extraneous objects.

In an embodiment, the starter unit is designed to output the starting point in time as early as possible and already outputs it when a permissible extraneous object is still in the image area. This can further increase the throughput.

For easy classification, the camera generates depth values, i.e. a 3D image is captured, because then the image evaluation unit can take the depth values into account during object classification, which makes classification easier.

In another embodiment of the invention, the evaluation unit is usefully designed to output a message, i.e. an error signal, if no starting point in time could be determined within a waiting time. In this way, the user of the system can quickly recognize that the master data has not been recorded.

In the following, the invention is explained in detail by means of an example of an embodiment with reference to the drawing. In the drawing FIG. 1 shows a schematic representation of the device according to the inventive subject matter;

Figures 1, 2:
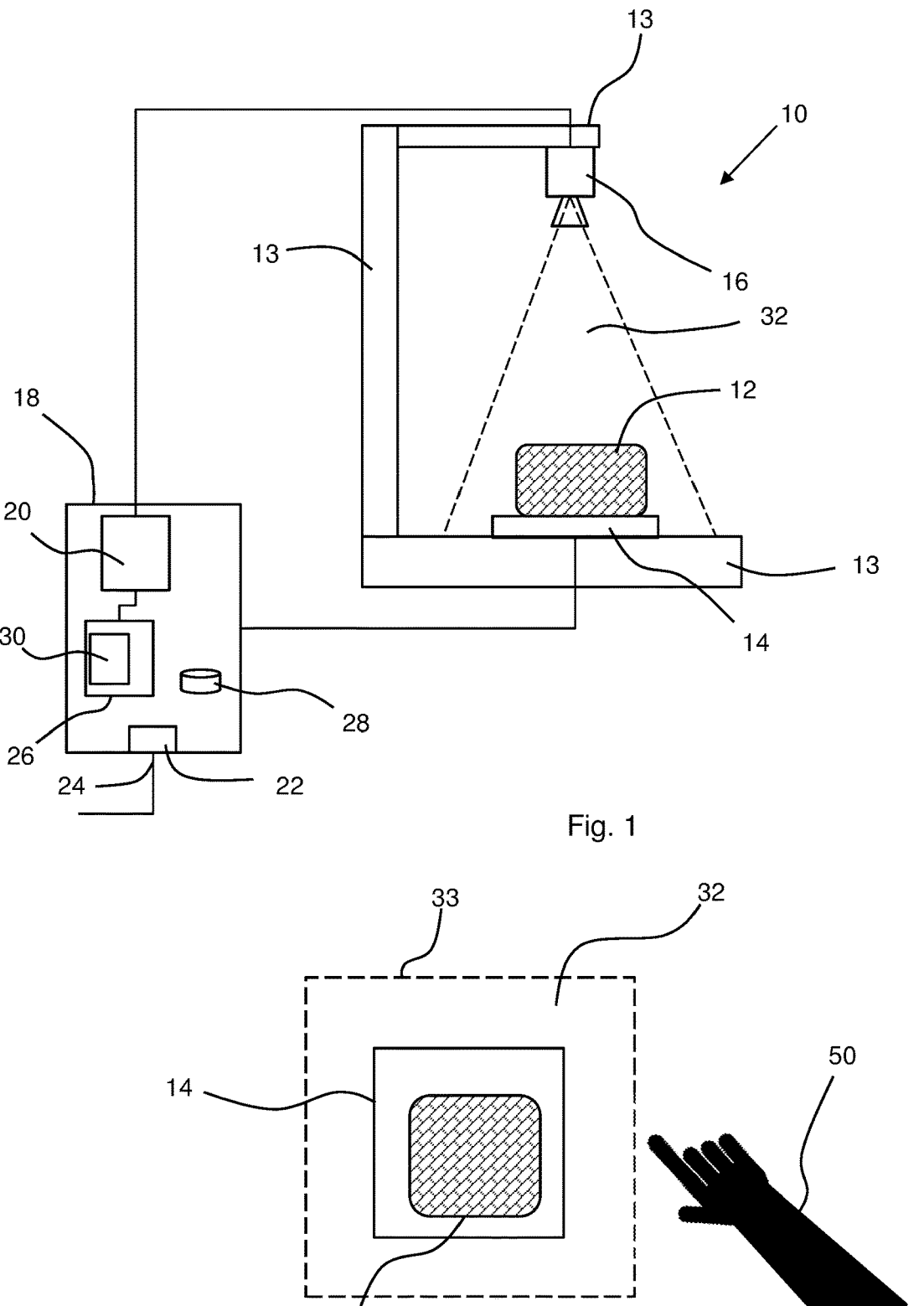
FIGS. 2 to 6 show schematic top views of the camera's field of view, each with a extraneous object in a different position.

The device 10 according to the inventive subject matter is used to record master data of an object 12. In addition to mechanical construction elements 13, the device 10 has a scale 14, a camera 16 for recording an image of the object 12 and an evaluation unit 18. The evaluation unit 18 comprises a volume determination unit 20 for determining the volume of the object 12. These units can comprise printed circuit boards and electronic components including programmable IC's or the like to fulfill their evaluation tasks. The scale 14 is used to detect the weight of the object 12, and the volume determination unit 20 is used to determine the volume. The data thus determined can ultimately be output via an output unit 22 as master data or at least as part of master data at an output 24. A memory 28 is provided for storing or temporarily storing the acquired master data.

The evaluation unit 18 further comprises a starter unit 26, which automatically determines a starting point in time for recording and determining the master data relating to the object volume when the object 12 is deposited in the field of view 32 of the camera 16. For this purpose, the starter unit 26 is designed to determine the starting point in time from the recorded image of the camera 16 and has an image evaluation unit 30, wherein the image evaluation unit 30 is designed to perform an object classification, with which, in addition to the object 12, extraneous objects 50 are also classified as permissible or impermissible.

The starter unit 26 is designed to output the starting point in time as early as possible and can output it even when a extraneous object 50 classified as permissible is still in the image area 32 of the camera 16.

The camera 16 is designed as a 3D camera which, in addition to a 2D image with image edge 33, also determines depth values for each pixel and thus captures a 3D image overall.

Figure 7:
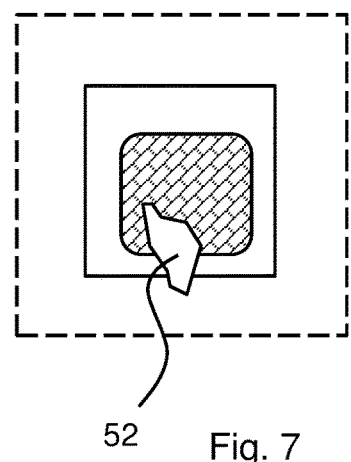
FIG. 7 shows a schematic top view of the camera's field of view with image defects.
Figure 8:
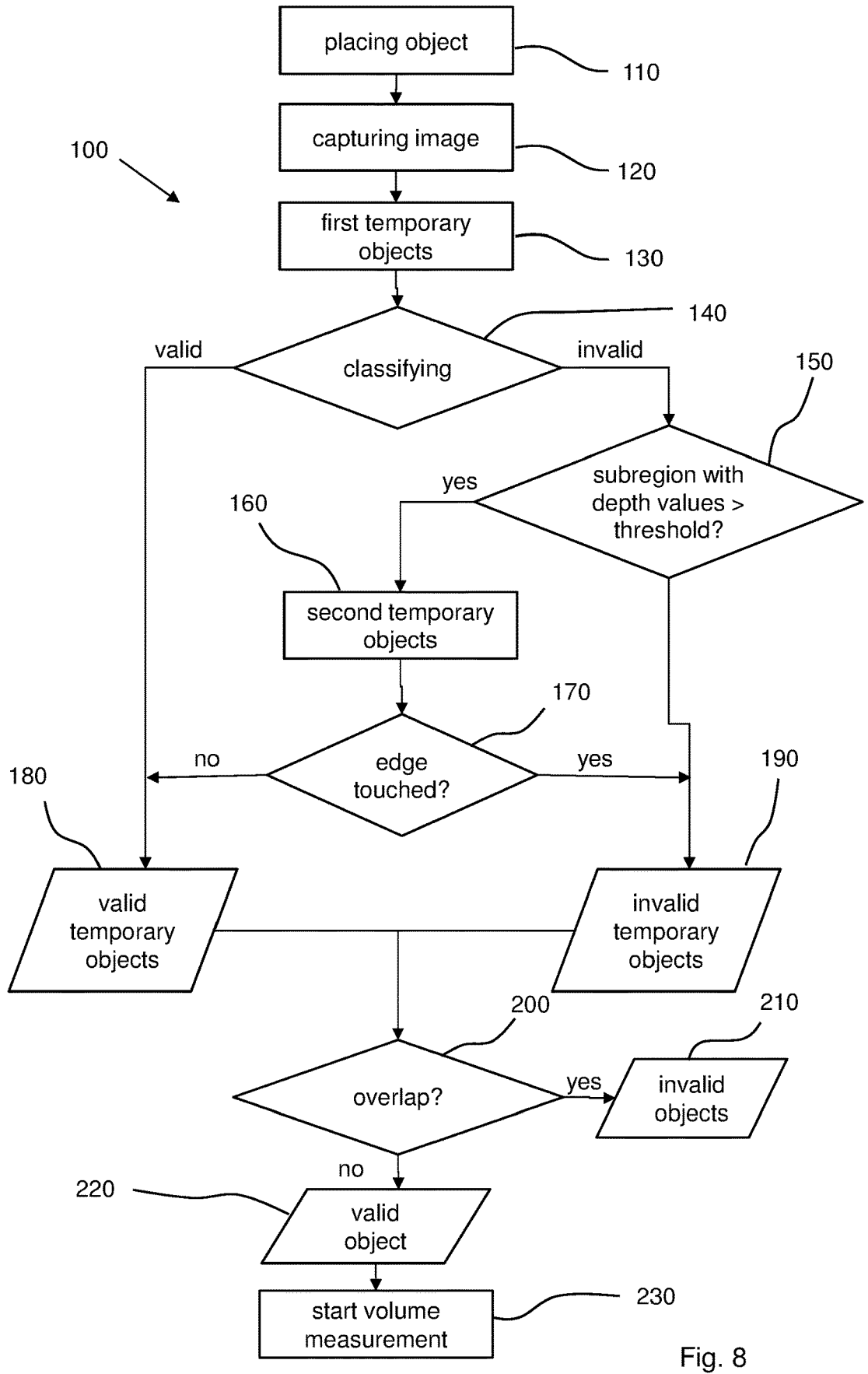
FIG. 8 shows a flow chart of the method according to the inventive subject matter.

A flowchart of an embodiment of at least part of the method 100 according to the inventive subject matter is shown in FIG. 8 and is also explained below with reference to FIGS. 3 to 7. FIGS. 3 to 7 each show a top view of the scale 14 and an object 12 placed thereon as seen by the camera 16. In the figures, the edge 33 of the field of view 32 is also shown as a dashed line, which is the image edge 33 in the 2D image.

The method 100 largely runs in the starter unit 26 with the aim of starting the acquisition of the volume of the object 12 and thus the master data acquisition by a start signal at a starting point in time.

In a first step 110, the object is placed on the scale 14.

A starting point in time is then determined at which the start signal can be given to start recording the master data. The starting point in time is determined by the following steps.

In a step 120, an image of the object 12 having depth values is captured by the camera 16.

In a step 130, contiguous regions in the image are determined from the image based on the depth values. Regions in the sense of this patent may be individual pixels or groups of pixels of the image. These contiguous regions form initial temporal objects.

Figures 3, 4:
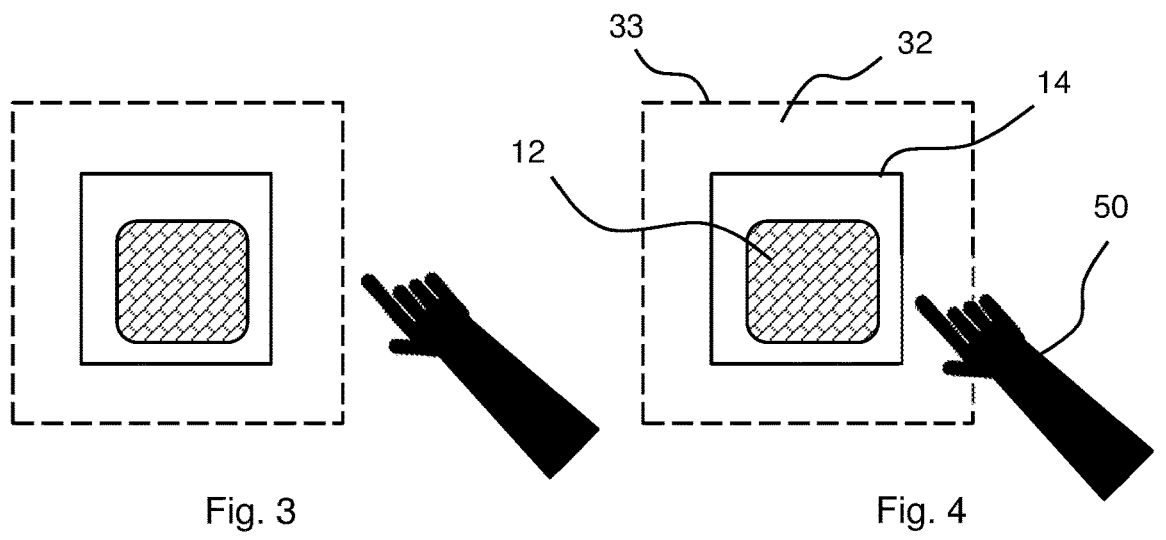
Figures 5, 6:
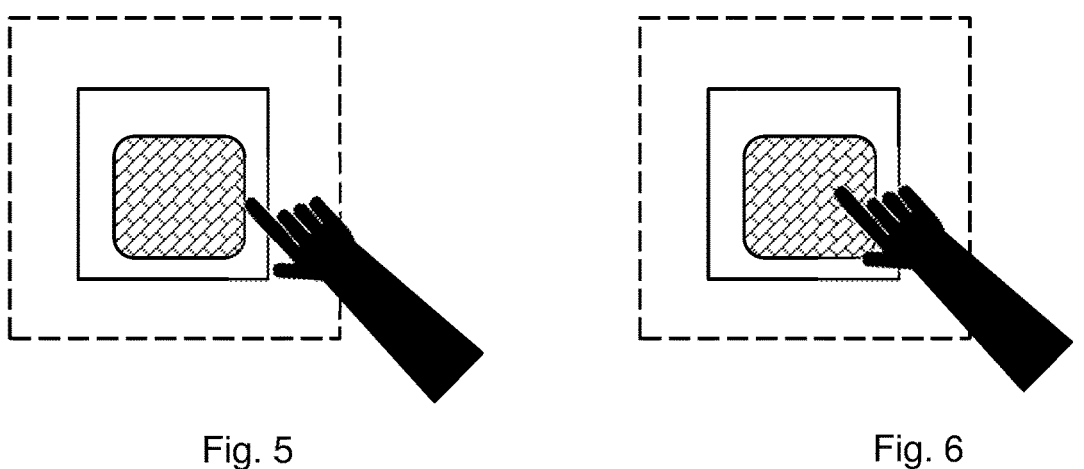

In FIG. 3, for example, such a contiguous region would be the object 12. In FIG. 6, a contiguous region would be the hand with arm projecting into the field of view 32, i.e., the extraneous object 50, together with the object 12 partially obscured by the hand. All image evaluation is performed in the image evaluation unit 30.

In a next step 140, the first temporary objects are classified into a valid class and an invalid class, wherein all first temporary objects that lie within the image without touching the image edge 33 are sorted into the valid class and first temporary objects with edge contact are sorted into the invalid class.

In this way, for example in a situation according to FIG. 3, the object 12 is sorted into the valid class;

in a situation according to FIG. 4, the object 12 is in the valid class and the extraneous object 50 is in the invalid class;

in a situation according to FIGS. 5 and 6, there is only one first temporary object in each case, since the extraneous object 50 at least touches the object 12 to be measured and these two then form the first temporary object. This first temporary object is sorted into the invalid class.

FIG. 7 shows a situation where there is no extraneous object 50, but there is an area 52 in the viewing area 32 where there are no depth values. This particular error situation will be considered later.

In step 150, the first temporary objects that were sorted into the invalid class are analyzed. The depth values are evaluated and it is checked whether they lie beyond a depth value threshold. If this is the case, then the regions form a new subregion.

For the evaluation of the depth values and for the formation of new subregions with depth values beyond a depth value threshold, depth value histograms are preferably recorded and evaluated in the evaluation unit 18.

In a next step, the subregions are examined to check if they are contiguous and the contiguous regions then form second temporary objects. Normally, peaks in the depth value histogram correspond to the second temporary objects. By this and with the depth value histograms, object 12 and extraneous object 50 are separated into two second temporary objects in the situations shown in FIGS. 5 and 6.

In a next step 170, it is checked whether these second temporary objects touch the image edge 33. If a second temporary object does not touch the image edge 33, then this second temporary object is moved from the invalid class to the valid class. This would be, for example, the object 12 in FIG. 5.

Thus, up to this point, the method according to the invention has found temporary objects that are sorted into either the valid class 180 or the invalid class 190.

In a following step 200 it is checked whether there are overlaps of the temporary objects of the valid class with the temporary objects remaining in the invalid class. In this context, it makes sense that an overlap is classified as overlap if the overlapping area is sufficiently large, i.e., an overlap-threshold is exceeded. FIG. 6 shows such an overlap, where the hand covers a sufficiently large area of the object 12.

If there is an overlap, the relevant temporary objects that were previously in the valid class (reference numeral 180) are moved from the valid class to the invalid class (reference numeral 210). In the situation shown in FIG. 6, object 12 is thus moved to the invalid class.

If there is no overlap, as is the case for object 12 in the situations shown in FIGS. 4 and 5, for example, object 12 remains in the valid class.

Since it happens from time to time in a 3D camera that depth values are missing in regions of the image, for example due to defective pixels or evaluation errors, and no meaningful evaluation can take place in the presence of such regions 52 without depth values, the search for overlaps preferably also includes the search for overlaps of the temporary objects in the valid class with the regions 52 with missing depth values. If a sufficiently large overlap is found, the temporary object in question is moved from the valid class to the invalid class. Such a situation is shown in FIG. 7.

After these steps, in step 220 the temporary objects remaining in the valid class are defined as the object to be measured.

The starting point in time is thus found and a start signal is given and then, in a step 230, the volume detection of the object 12 is started (starting point in time).

The volume data is calculated from the 3D images of the camera 16 in the volume determination unit 20 and forms part of the master data, which is collected in a memory 28 and then output via the output unit 22 over the output 24.

It makes sense to output an error signal if no object 12 remains in the valid class when determining the starting point in time, which means that master data acquisition is not possible. Then also no start signal is issued.

What is claimed is:

1. A method for acquiring master data of an object (12) comprising the steps:

weighing the object on a scale (14), determining a starting point in time for recording the master data by:

taking a depth value image of the object (12) with a camera (16), determining contiguous regions in the image that then form first temporary objects, classifying the first temporary objects into a valid and an invalid class, wherein all first temporary objects that lie within the image without touching the image edge (33) are sorted into the valid class and first temporary objects with edge contact are sorted into the invalid class, analyzing the first temporary objects in the invalid class by evaluating the depth values and forming new subregions with depth values beyond a depth value threshold, scanning the subregions for contiguous areas, wherein the contiguous areas form second temporary objects, moving the second temporary objects to the valid class if the second temporary objects they do not touch the image edge (33), finding overlaps of the first or second temporary objects in the valid class with the first or second temporary objects remaining in the invalid class, where the overlap must exceed an overlap threshold, in case of overlap, moving the temporary objects in question from the valid class to the invalid class, defining the first or second temporary objects in the valid class as the object to be measured, the defining of the first or second temporary objects in the valid class defining the starting point in time, wherein an error signal is output when none of the first or second temporary objects are defined in the valid class;

following the determination of the starting point in time, starting a volume detection of the object (12), recording the master data, saving the recorded master data, and outputting of the master data.

2. The method according to claim 1, wherein depth value histograms are recorded and evaluated for evaluation of the depth values and formation of new subregions with depth values beyond a depth value threshold.

3. The method according to claim 1, wherein, in the presence of regions with missing depth values, the finding of the overlaps of the first or second temporary objects further comprises finding the overlaps of the first or second temporary objects in the valid class with the regions with missing depth values and, in the case of overlaps, a relevant one of the first or second temporary objects that overlaps with the regions with missing depth values is moved from the valid class to the invalid class.

4. A device for acquiring master data of an object (12) for carrying out a method according to claim 1, comprising:

a scale (14), a camera (16) for capturing an image of the object (12), an evaluation unit (18) with a volume determination unit (20) for determining the volume of the object (12), a starter unit (26) which automatically determines a starting point in time for recording the master data concerning the object volume when the object (12) is placed on the scale (14), a memory (28) for storing the recorded master data, an output unit (22) for outputting the master data, wherein the starter unit (26) is configured to determine the starting point in time from the recorded image of the camera (16), and the starter unit (26) has an image evaluation unit (30) for a purpose of determining the starting point in time, and the image evaluation unit (30) is configured to carry out an object classification by means of which, in addition to the object (12), extraneous objects (50) are also classified as permissible or impermissible extraneous objects (50).

5. The device according to claim 4, wherein the starter unit is configured to output the starting point in time and outputs the starting point in time when a permissible extraneous object is still located in the image area.

6. The device according to claim 4, wherein the camera is adapted to generate an image comprising depth values.

7. The device according to claim 6, wherein the image evaluation unit is designed to perform the object classification taking into account the depth values.

8. The device according to claim 4, wherein the evaluation unit is designed to output a message if no starting point in time could be determined within a waiting time.

\* \* \* \* \*